United States Patent [19]

Grumblatt

[11] Patent Number: 5,275,525
[45] Date of Patent: Jan. 4, 1994

[54] BATTERY CHANGER ON A MOBILE MACHINE

[75] Inventor: Shawn P. Grumblatt, Fairmont, W. Va.

[73] Assignee: Tamrock World Corporation, N.V., Curacao, Netherlands Antilles

[21] Appl. No.: 823,312

[22] Filed: Jan. 21, 1992

[51] Int. Cl.$^5$ .............................................. B62D 25/00
[52] U.S. Cl. .................... 414/458; 414/546; 414/346; 414/680; 104/34; 180/68.5
[58] Field of Search ............... 414/680, 685, 687, 722, 414/727, 729, 458, 459, 546, 346; 104/34; 180/68.5; 248/503

[56] References Cited

U.S. PATENT DOCUMENTS

| 1,552,320 | 9/1925 | Lea | 180/68.5 |
|---|---|---|---|
| 2,730,252 | 1/1956 | Oswalt | 414/680 X |
| 3,284,153 | 11/1966 | Goodacre | 180/68.5 X |
| 3,327,875 | 6/1967 | Goodacre . | |
| 3,782,750 | 1/1974 | Peters | 280/43.17 |
| 3,799,063 | 3/1974 | Reed | 104/134 |
| 3,834,563 | 9/1974 | Teti . | |
| 3,860,193 | 1/1975 | Green | 414/458 X |
| 4,114,770 | 9/1978 | Jordan et al. | 414/680 |
| 4,299,526 | 11/1981 | Smith | 414/392 |
| 4,342,533 | 8/1982 | Hane | 414/396 |
| 4,397,365 | 9/1983 | Harbe et al. | 180/68.5 |
| 4,808,058 | 2/1989 | Carney et al. | 414/343 |

FOREIGN PATENT DOCUMENTS

| 90383 | 5/1922 | Austria | 104/34 |
|---|---|---|---|
| 1290675 | 3/1969 | Fed. Rep. of Germany | 414/469 |

Primary Examiner—Frank E. Werner
Attorney, Agent, or Firm—Stanley J. Price, Jr.

[57] ABSTRACT

A battery holder for containing an electric storage battery is transported by a lift unit on a mobile vehicle. The lift unit is pivotally mounted at a rearward end portion of the vehicle to move into surrounding relation with the battery holder positioned on the ground. The lift unit is pivoted upwardly to raise the battery holder to a preselected elevation within the minimal lateral and overhead clearance available in an underground mine. The lift unit includes a pair of lifting forks extending in spaced parallel relation from the vehicle within the lateral dimensions of the vehicle. The lifting forks have a configuration adapted to permit downward movement of the forks into engagement with the ground to pick up a battery holder positioned on the ground. The lifting forks extend laterally of the battery holder and engage the holder for vertical movement to an elevated position that does not exceed the uppermost position for transportation of the battery in areas of minimal overhead clearance. Piston cylinder assemblies are operable to raise and lower the lifting forks in a manner that assures secure positioning of the battery holder on the lifting forks once the lifting forks engage the holder and raise the holder to an operating height that does not exceed the maximum vertical dimension of the mobile vehicle.

13 Claims, 4 Drawing Sheets

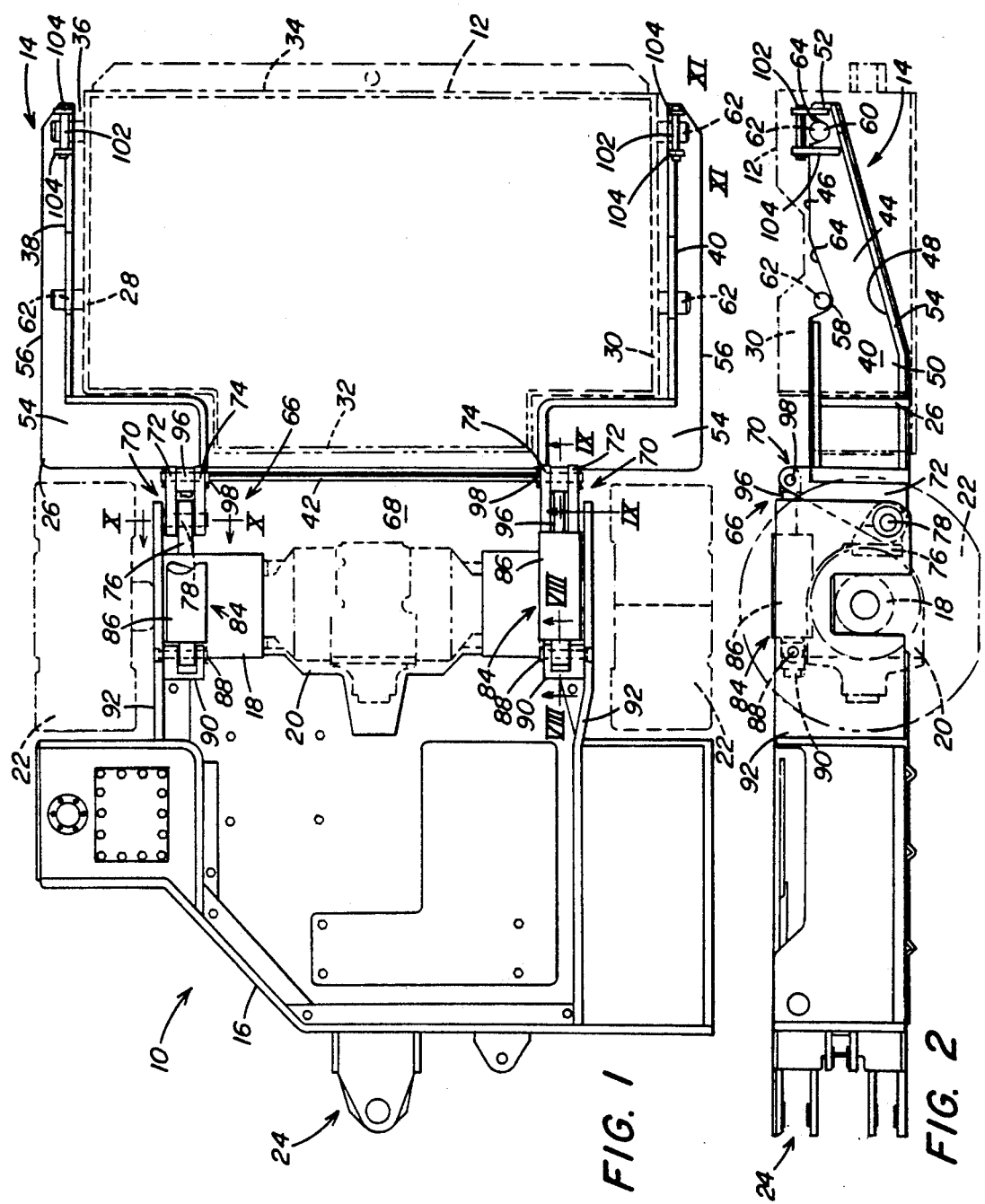

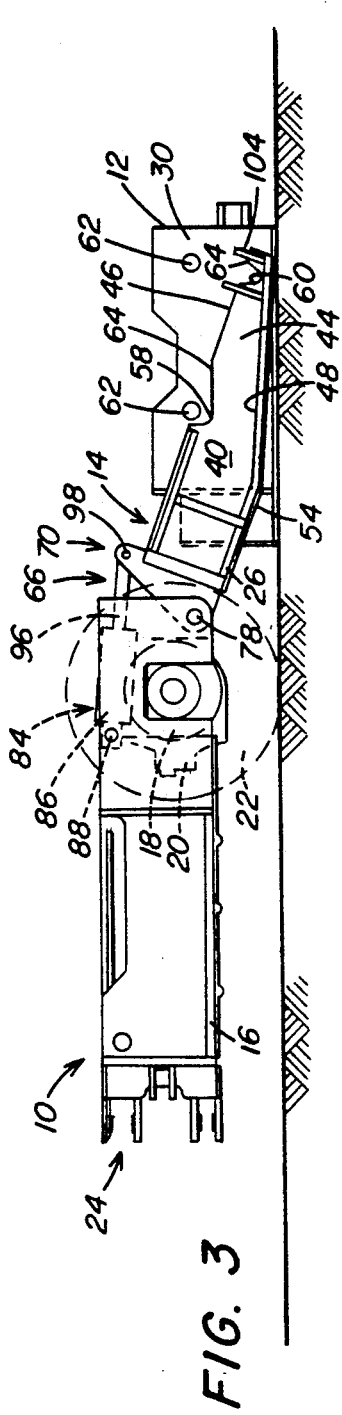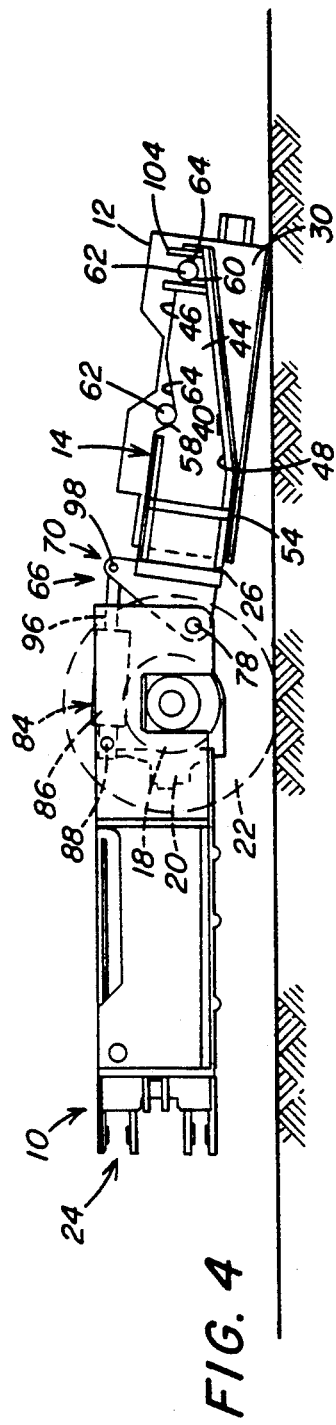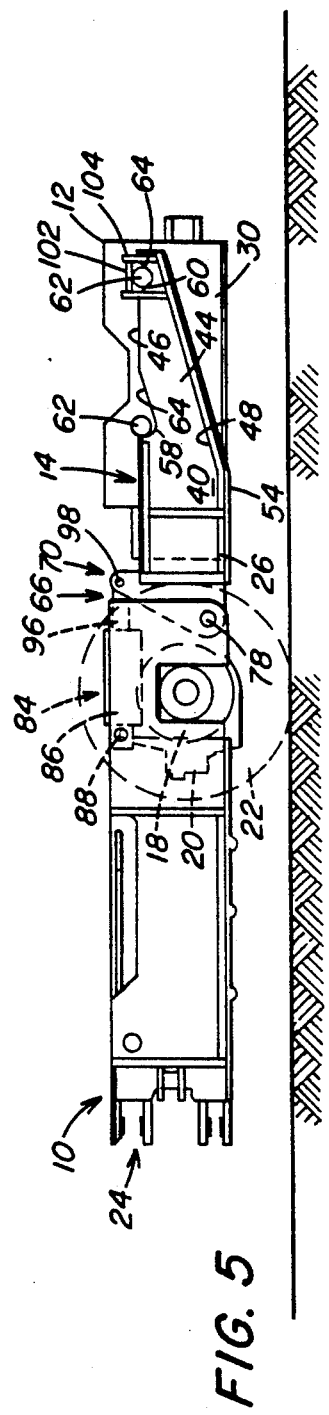

BATTERY CHANGER ON A MOBILE MACHINE

BACKGROUND OF THE INVENTION

1. Field of the Invention

This invention relates to method and apparatus for moving a battery into and out of position on a mobile machine and more particularly to method and apparatus for lifting a battery holder or box containing an electrical battery from an initial position on the ground to an elevated position on a machine for transporting the battery for use in powering electrical vehicles and equipment in an underground mine.

2. Description of the Prior Art

In underground mining operations it is conventional practice to supply electrically driven vehicles and electrically operated equipment with electrical power supplied from storage batteries. The batteries in some instances may be stationarily positioned at a fixed power station or mounted on mobile equipment for providing electrical power to the vehicle that transports the battery. After a period of use a spent battery must be replaced on the vehicle or at the power station with a charged battery. This requires that the spent battery and the charged battery be moved into and out of position at the place of operation.

Battery changers and exchanging devices are well known for use in transporting a battery from one location to another in a mine. An example of a vehicle battery changer is disclosed in U.S. Pat. No. 3,799,063 and includes a mobile vehicle having a low profile adaptable for use in low overhead subterranean locations, such as mine shafts. The vehicle is propelled by electric motors that are powered by electric storage batteries containing a substantial number of cells and are a substantial size and weight. The batteries are positioned in cases or boxes which are supported in compartments built into the frame of the vehicle. The batteries contained in the cases are electrically connected to the vehicle drive and control mechanisms. Lift arms are pivotally mounted to the vehicle frame and releasably attached at their free ends to the battery case. The lift arms are pivotal laterally and outwardly from the upright walls of the vehicle. The batteries on the vehicle must be replaced when the electrical charge falls below the minimum required to supply the necessary power to the vehicle. The ends of the lift arms are connected to the battery cases and the piston cylinder assemblies extending between the vehicle frame and the pivot arms are actuated to pivot the arms outwardly from the upright walls to lift the battery cases out of the compartments and lower the batteries onto the ground where the lift arms are disengaged. The spent batteries are then replaced with charged batteries which are connected to the lift arms. The lift arms are raised by the piston cylinder assemblies from the outboard position to the inboard position and then lowered into place in the battery compartment.

Where the lift arms are required to pivot laterally and outwardly from the upright walls of the vehicle, ample space must be provided between the vehicle and the side walls of the mine shaft for the batteries to be raised and lowered into and out of position in the battery compartment. In addition, substantial overhead clearance must be available to permit the battery to be raised to an elevation above the vehicle for lowering the battery into position in the battery compartment.

U.S. Pat. No. 4,397,365 discloses a front end loader powered by an electrical traction motor system. The electrical power is supplied from a storage battery that is carried by a lifting frame swingably connected to the chassis frame of the vehicle. After a period of time of operation of the front end loader, a spent battery must be exchanged for a charged battery. During the battery exchange operation the power is switched over to a low tension voltage battery on the vehicle. The high voltage battery is then disconnected from the electrically operated equipment on the vehicle. The vehicle is moved into position adjacent a pallet for receiving the spent battery. The pallet is positioned on the ground. To position the spent battery on the pallet, the lifting frame is elevated and guided into openings on the pallet to receive the battery box. The lifting frame is lowered to in turn lower the battery box on the pallet. The lifting frame passes through the openings in the pallet so that the battery box is transferred from the lifting frame to the pallet. The vehicle is then moved to another location where a charged battery is positioned on a pallet. The lifting frame is moved into a position to engage the charged battery on the second pallet. The vehicle is then backed away from the second pallet to transfer the charged battery from the pallet to the lifting frame. Thereafter, the battery is elevated by the lifting frame to complete the electrical connection of the charged battery to the operating equipment on the vehicle. The low voltage battery is then disconnected. This operation requires a substantial amount of space for maneuvering a spent battery into position on a pallet and then moving the vehicle to another pallet to pick up a charged battery, followed by transfer of the charged battery onto the vehicle. The lifting frame must be elevated above the vehicle frame in order to complete the connection of the replacement battery to the operating equipment. Therefore, substantial overhead clearance is required to change a battery.

U.S. Pat. No. 3,834,563 discloses a battery carrier by which a battery is raised from a position on the ground a minimum vertical amount and then by pivotal movement of arm assemblies is moved in a substantially greater transverse motion into a battery compartment of an electrically powered mine car. The arm assemblies are actuated by hydraulic piston cylinder assemblies to move the battery from an initial position removed from the vehicle, such as on the ground, upwardly to a vertical height a sufficient distance to clear a threshold bar of the battery compartment. The pivot arm assemblies are then moved to transfer the battery in an arcuate path into the battery compartment. Initially the battery is positioned laterally of the side wall of the vehicle so that in a confined space, such as a mine shaft, sufficient space must be available between the side wall of the mine shaft and the side wall of the battery compartment to allow for the upward and laterally swinging movement of the pivot arms. A spent battery is removed from the vehicle through the same range of movement.

U.S. Pat. No. 3,782,750 discloses a battery truck containing a box in which a large storage battery is positioned. The box completely surrounds the battery. The floor and side walls of the box are supported by a carriage that is movable by action of lever and eccentric cams to raise and lower the battery box on the truck frame. When in use, the battery is positioned in the box which rests on a fixed surface, such as the surface of a battery compartment on a vehicle where the battery is used. Once the battery is spent and is to be replaced with a charged battery, the carriage is lowered so that the battery box is raised above the supporting surface to permit the truck to be moved. When the truck is in the desired location, the battery box is then immobilized as the carriage is raised to lower the bottom of the box onto a supporting surface.

It is also known to exchange spent batteries on electrically powered equipment by moving a battery transport mechanism into position adjacent the spent battery on a vehicle. The support structure is moved laterally into underlying engagement with the spent battery to lift the spent battery from the electrically powered vehicle and transfer the battery to the adjacently positioned transport mechanism. An example of a battery handling device of this type is disclosed in U.S. Pat. No. 4,808,058.

U.S. Pat. No. 3,327,875 also discloses apparatus movable into position adjacent an electrically powered vehicle for transferring a battery from the vehicle to an adjacent carriage. This permits the battery to be removed from the vehicle and a replacement battery installed.

U.S. Pat. Nos. 4,299,526 and 4,342,533 are further examples of battery changing apparatus that include transfer mechanisms for lifting vertically and horizontally batteries into and out of position on the support surface of an electrically powered vehicle. Each of these devices require substantial clearance around the battery and the electrically operated equipment to facilitate the movement of the battery transfer device into and out of position to exchange batteries on the vehicle. These devices are not suitable for use in confined spaces, such as mine shafts, where minimal area is available for maneuvering of the electrically powered vehicle or the mechanism for transferring the batteries on the vehicle.

Therefore, there is need to provide battery changing apparatus that is suitable for use in an underground mine where limited lateral and overhead clearance is available for movement of a battery box or battery holder into and out of position on a vehicle that transports the battery throughout the mine. While the prior art devices disclose various mechanisms for handling batteries on a vehicle and particularly an electrically powered vehicle used in underground mining, there is need for battery changing apparatus that is operable to pick up a battery from the ground and move it to a secure operating position that does not require lateral or vertical movement of the lifting apparatus beyond the operating position. The range of movement of the battery changer must allow exchange of batteries on a vehicle in areas having low overhead clearance. Where the side walls of the vehicle are positioned closely adjacent to the side walls of a mine shaft the battery change must be accomplished without requiring lateral movement of the battery.

SUMMARY OF THE INVENTION

In accordance with the present invention there is provided a mobile battery changer that includes a mobile frame having a front end portion and rearward end portion. A battery lift unit is provided, and mounting means pivotally connect the battery lift unit to the frame rearward end portion. Actuation means extends between the battery lift unit and the frame rearward end portion for pivoting the battery lift unit on the mobile frame between a first position for engaging a battery holder positioned on the ground and a second position for raising the battery holder to a preselected elevation above the ground. The battery lift unit has load bearing surfaces extending in surrounding relation with the periphery of the battery holder to receive the weight of the battery holder upon upward movement of the battery lift unit and support the battery holder as the battery holder is raised from the ground floor to an elevation above the ground for a transport of the battery holder.

Further, in accordance with the present invention there is provided a method for picking up and transporting a battery holder that includes the steps of extending a lift unit rearwardly from a frame of a transport vehicle. The lift unit is supported for pivotal movement on the frame between a lowermost position in contact with the ground and an uppermost position raised to a preselected elevation above the ground. The lift unit is positioned in close adjacency to the periphery of a battery holder positioned on the ground. The lift unit is raised relative to the battery holder to engage the battery holder and transfer the weight of the battery holder to the lift unit. The battery holder is supported securely on the lift unit as the lift unit pivots upwardly from the ground to move the battery holder to a preferred elevation for transporting the battery holder.

Additionally, the present invention is directed to a battery lift unit that includes a frame having an elongated support plate with opposite end portions. A pair of lift arms are connected to the plate opposite end portions and extend forwardly in spaced parallel relation therefrom to form an opening for receiving a battery holder. A pair of brackets is connected in spaced parallel relation to the support plate and extends therefrom in a direction oppositely of the lift arms. Means is positioned on the pair of brackets for receiving a pivot pin to support the frame for pivotal movement about the pin. Means is connected to the pair of brackets for actuating pivotal movement of the frame. The pair of lift arms each have an upper surface with a camming portion for receiving and guiding the battery holder to a position securely supported by the lift arms.

Accordingly, the principal object of the present invention is to provide method and apparatus for changing storage batteries on a mobile vehicle within the limited overhead and lateral clearance available in an underground mine.

Another object of the present invention is to provide a lift unit for exchanging a spent storage battery with a charged storage battery through a range of movement between the battery positioned on the ground to a preselected elevated position on the vehicle.

A further object of the present invention is to provide on a mobile vehicle in an underground mine a lift unit for changing batteries on the vehicle where the battery is initially picked up from the ground and elevated to a preselected height for normal operation where movement of the lift unit does not extend above the normal operating height of the vehicle.

An additional object of the present invention is to provide method and apparatus for raising and lowering a storage battery on a vehicle in an underground mine where the battery is lifted from ground level to an operating position without requiring lateral movement of the battery or lifting the battery to a position above its normal operating position before it is securely in place.

These and other objects of the present invention will be more completely disclosed and described in the following specification, the accompanying drawings, and the appended claims.

BRIEF DESCRIPTION OF THE DRAWINGS

FIG. 1 is a top plan view of a mobile vehicle adaptable for use in an underground mine for transporting an electrical storage battery, illustrating a lift unit for moving the battery into and out of position on the vehicle.

FIG. 2 is a view in side elevation of the vehicle shown in FIG. 1, illustrating the battery lift unit and a battery holder, shown in phantom, supported by the lift unit in an operating position.

FIG. 3 is a schematic illustration in side elevation of the vehicle shown in FIG. 1, illustrating the battery lift unit tilted downwardly to engage the battery holder positioned on the ground.

FIG. 4 is a view similar to FIG. 3, illustrating the initial movement of the lift unit to raise the battery holder from ground level.

FIG. 5 is a view similar to FIGS. 3 and 4, illustrating the battery holder raised by the lift unit from ground level to its operating position.

DESCRIPTION OF THE PREFERRED EMBODIMENTS

Figure 6:
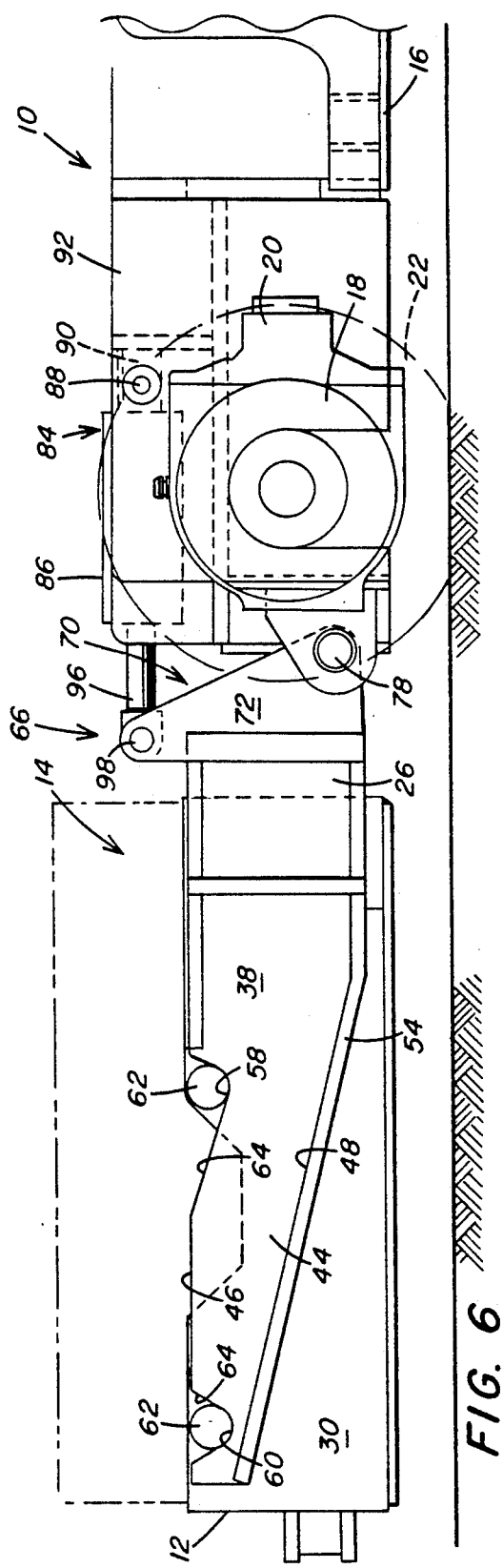
FIG. 6 is a fragmentary schematic view of the battery changing apparatus of the present invention, illustrating the lift unit positioned on a low profile vehicle for use in an underground mine having minimal overhead clearance.

Referring to the drawings and particularly to FIGS. 1 and 2, there is illustrated a mobile vehicle generally designated by the numeral 10 for transporting an electrical storage battery (not shown) in a battery holder 12, shown in phantom in FIGS. 1 and 2, by a lift unit generally designated by the numeral 14 pivotally mounted on the vehicle 10. The vehicle 10 is adaptable for use in underground mining operations and the like where overhead and lateral clearance for the raising and lowering of the battery by the lift unit 14 is minimal. The vehicle 10 includes a frame 16 mounted on an axle assembly 18 drivingly connected through a conventional transmission 20 to wheels 22 shown in phantom in FIGS. 1 and 2.

The vehicle 10 may be provided with suitable drive means (not shown) for propelling the vehicle, such as an electrically powered drive motor which would be connected to the storage battery positioned in the holder 12 on the lift unit 14. In another arrangement, the vehicle 10 may be pulled or towed by another vehicle which would receive electrical power from the battery on the lift unit 14. As shown in FIGS. 1 and 2, the vehicle frame 16 is provided with a clevis assembly generally designated by the numeral 24 to facilitate connection of the vehicle frame 16 to another vehicle.

The battery holder 12 illustrated in phantom in FIGS. 1 and 2 is constructed to receive and support a large electrical storage battery which may comprise a plurality of cell units. The battery has a capacity to supply electrical power to operating machinery for a selected period of time which may vary from two hours up to the time for completing an entire work shift in an underground mine. The mobile vehicle 10 has a low profile and in accordance with the present invention the lift unit 14 is pivotally mounted on the vehicle frame 16.

The lift unit 14 is mounted on the vehicle frame 16 to raise and lower the battery holder 12 within the dimensional limits of the low profile of the vehicle frame. The lift unit 14 supports the battery holder 12 in a normal tramming position as shown in FIG. 2 where the top of the battery holder 12 does not exceed the height dimensions or the width dimensions of the low profile vehicle 10. Thus, the vehicle 10 with the lift unit 14 and battery holder 12 positioned thereon is maneuverable throughout a mine where the battery holder 12 is capable of being raised and lowered in the operation of changing batteries on the vehicle 10 at any location in the mine where the vehicle 10 is capable of being maneuvered. In this regard, the operation of changing batteries on the vehicle 10 does not limit the maneuverability of the vehicle 10 in a mine so that the battery exchange operation can take place at any location in a mine where the vehicle 10 is located.

The lift unit 14, as shown in FIGS. 1 and 2, includes a generally U-shaped frame 26 having a longitudinal axis aligned with the longitudinal axis of the vehicle frame 16. The lift unit 14 has an overall configuration that is adapted to surround in close conformity to lateral side walls 28 and 30 and a rear wall 32 of battery holder 12. A front wall 34 of battery holder 12 extends forwardly from an opening 36 formed in the lift unit frame 26 by a pair of lifting forks or arms 38 and 40. The arms 38 and 40 are connected, as by welding, in spaced parallel relation to the opposite ends of an elongated support plate 42. The arms 38 and 40 extend from the support plate 42 symmetrically about the longitudinal axis of the vehicle support frame 16. The plate 42 extends transversely on the vehicle frame 16. Each of the lifting forks 38 and 40 is a composite structure of plates welded together to provide sufficient structural rigidity to support the heavy weight of a storage battery positioned in the battery holder 12.

Each lifting fork 38 and 40 includes an upstanding plate 44 having an upper surface 46 and a lower surface 48. The plate upper surface 46 is positioned horizontally when the lift unit 14 is raised to the normal operating position as shown in FIG. 2. The lower surface 48 extends upwardly at an angle from end portion 50 to end portion 52 of the plate 44. With this construction each of the lifting arms or forks 38 and 40 is movable, as shown in FIG. 3, to a lowermost position closely adjacent to the ground to pick up the battery holder 12.

The lower angled surfaces 48 of each of the plates 44 facilitate unobstructed downward movement of the lifting forks 38 and 40 so that a battery holder 12 positioned on the ground can be picked up without requiring that the battery holder 12 be positioned on a pallet or on a support elevating the battery holder above the ground. Accordingly, the lift unit 14, because of the above described configuration of the lifting forks 38 and 40, can be pivoted closely adjacent to the ground to pick up a battery holder 12 on the ground.

To reinforce each plate 44 forming the lifting forks 38 and 40 a reinforcing plate 54 extends substantially horizontally outwardly from the lower surface 48 of the plate 44. The reinforcing plate 54 is also connected, as by welding, to the transversely extending support plate 42 and thereby serves to rigidify the connection of the respective plates 44 to the support plate 42 that forms the rear wall of the lift unit 14. The reinforcing plates 54 extend outwardly from the upstanding plates 44 a distance that does not project beyond the lateral peripheral limits of the vehicle 10. For example, as seen in FIG. 1, each of the plates 54 includes an outboard edge 56 that is aligned with or preferably slightly inboard of the outboard dimensions of the vehicle 10 formed by the tire 22 and frame 16. This arrangement assures that the lift unit 14 is vertically pivotally movable within the transverse width of the vehicle frame 16. Consequently, wherever the vehicle 10 is capable of being positioned in a mine, the lift unit 14 is vertically movable without lateral obstruction, such as contacting the side walls of a mine passageway.

The upper surface 46 of each plate 44 forming the lifting forks 38 and 40, as seen in FIG. 2, includes a pair of arcuately shaped recesses 58 and 60 that are spaced from one another a preselected distance and are equally spaced below the plate upper surface 46 for receiving lugs 62 that extend outwardly from the battery holder side walls 28 and 30. Extending between the recesses 58 and 60 and the plate upper surface 46 are inclined or camming surfaces 64 that serve to guide the lugs 62 into a final position in the recessed portions 58 and 60. With this arrangement, upon the initial pick up of a battery holder 12 positioned on the ground as illustrated in FIG. 3, it is not necessary to manually guide the battery holder 12 so that the lugs 62 are positioned in the recesses 58 and 60. All that is required is that the vehicle 10 with the lifting unit 14 in its lowermost position as shown in FIG. 3, advance the unit 14 into surrounding relation with the battery holder 12 where the lugs 62 are positioned in overlying relation with the camming surfaces 64. Then as the lifting forks 38 and 40 are pivoted upwardly outboard of the battery holder side walls 28 and 30, the lugs 62 contact the inclined or camming surfaces 64. As the lift unit 14 continues to pivot upwardly, the camming surfaces 64 guide the lugs 62 downwardly into engagement with the recesses 58 and 60 so that the weight of the battery holder 12 containing a large storage battery is firmly supported on the lift unit 14.

Figure 10:
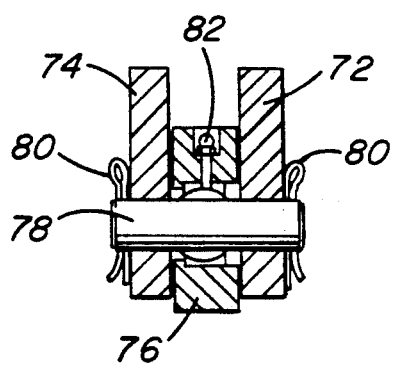
FIG. 10 is a fragmentary sectional view of the pivotal connection of the lift bracket to the frame of the vehicle, taken along line X—X in FIG. 1.
Figure 11:
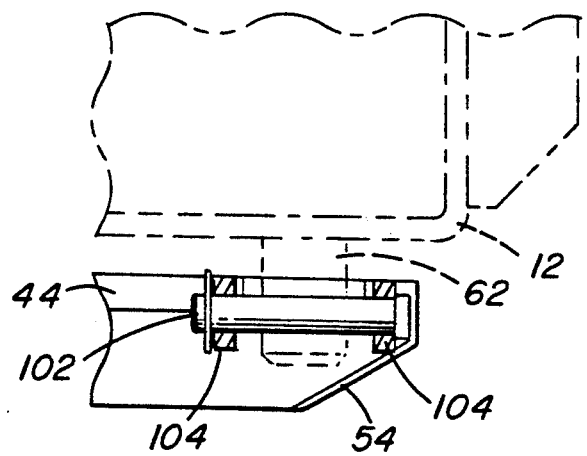
FIG. 11 is a fragmentary sectional view of the hold down mechanism for retaining the battery holder on the lift unit, taken along line XI—XI in FIG. 1.

The lift unit 14 is pivotally mounted to the mobile vehicle frame 16 by a mounting assembly generally designated by the numeral 66 that extends between the lift unit transverse support plate 42 and a rearward end portion 68 of the vehicle frame 16. Preferably the mounting assembly 66 includes a pair of lift brackets generally designated by the numeral 70, and each lift bracket 70 is formed by a pair of plates 72 and 74. The plates 72 and 74 are suitably connected, such as by welding, to the upright support plate 42 of the lift unit 14. The plates 72 and 74 are positioned on opposite sides of a rear frame pivot plate 76 that is secured to and extends outwardly from each side of the frame rearward end portion 68. The rear frame pivot plates 76 each include a bore therethrough aligned with bores in the plates 72 and 74 to receive a pivot pin 78. As shown in detail in FIG. 10, the pivot pin 78 is held in place within the aligned bores of the plates 72, 74 and 76 by cotter pins 80. The plate 76 also includes a grease fitting 82 for supplying lubricant to the pin connection of the plates 72 and 74 to the pivot plate 76.

Figure 8:
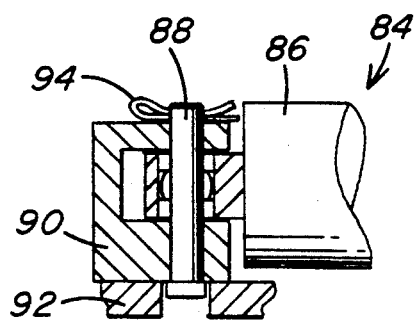
FIG. 8 is a fragmentary sectional view of the connection of the piston cylinder assembly for raising the lift unit to the frame of the vehicle, taken along line VIII—VIII in FIG. 1.

The upper end portions of the plates 72 and 74 for the lift bracket 70 are connected to a piston cylinder assembly generally designated by the numeral 84, as illustrated in detail in FIG. 8. Each of the piston cylinder assemblies 84 includes a cylinder portion 86 pivotally connected by a pin 88 to a cylinder mounting bracket 90. The bracket 90 is securely connected to an upstanding side wall 92 of the vehicle frame 16, as shown in FIG. 1. The side wall 92 includes an opening for receiving the pin 88 which extends through aligned bores in the mounting bracket 90 and the end of the cylinder 86. The pin 88 is retained in place by a cotter pin 94 as shown in FIG. 8.

Figure 9:
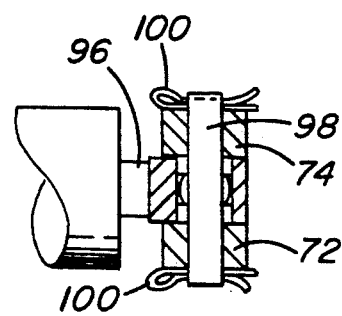
FIG. 9 is a fragmentary sectional view of the connection of the piston cylinder assembly shown in FIG. 8 to the lift bracket of the lift unit, taken along line IX—IX in FIG. 1.

The piston cylinder assemblies 84 each include an extensible piston rod 96 as seen in detail in FIG. 9. The piston rod 96 is extended and retracted upon actuation of the hydraulic piston cylinder assembly 84. The piston rod 96 is connected by a pin 98 that extends through aligned bores in an enlarged end of the piston rod 96 and the upper ends of the pair of lift bracket plates 72 and 74. The pin 98 is rotatably supported in the enlarged end of the piston rod 96 and retained within the bracket plates 72 and 74 by cotter pins 100.

With the arrangement shown in FIGS. 3-5 upon extension of the piston rods 96 from the cylinders 86, the brackets 70 are pivoted about the pins 78 away from the vehicle frame 16 to lower the lift unit 14. Initially the vehicle 10 is advanced to position the inboard surfaces of the lifting forks 38 and 40 closely adjacent to the periphery of the battery holder 12 formed by the side walls 28 and 30. Once in position, the lift unit 14 is lowered to a position where the recessed portions 58 and 60 are below the lugs 62. As discussed above, the configuration of the lifting forks 38 and 40 permits the forks to be pivoted through an extended downward range of movement to where the plate lower surfaces 48 are substantially at ground level. This permits the lift unit 14 to pick up the battery holder 12 positioned on the ground and does not require that the battery holder 12 be elevated above ground before it can be engaged by the lift unit 14.

Once in position to engage the lugs 62, the piston cylinder assemblies 84 are actuated to retract the piston rods 96 into the cylinders 86. Retraction of the piston rods 96 pivots the plates 72 and 74 about the pins 78 toward the vehicle frame 16. Upward pivotal movement of the lift unit 14 moves the camming surfaces 64 of the plates 44 into engagement with the lugs 62. As the lift unit 14 continues to move upwardly, the lugs 62 advance on the inclined surfaces 64 into firmly seated engagement with the recesses 58 and 60. The weight of the battery holder 12 is supported by the lugs 62 engaging the receiving or camming surfaces 64.

As soon as the lugs 62 contact the surfaces 64 and the lift unit 14 continues to pivot upwardly, the battery holder 12 is raised out of contact with the ground. In this manner, the battery holder 12 is raised from its position on the ground to an elevated position without requiring the lugs 62 to be initially positioned in the recesses 58 and 60. The lift unit 14 is raised from its initial position on the ground to an elevated position that does not extend above the normal operating position of the battery holder 12 as shown in FIG. 5.

Throughout its range of movement the lift unit 14 does not extend above the desired operating position of the battery holder 12. At all times, the lifting of the battery holder 12 is at an elevation below the final elevation of the battery 12 as shown in FIG. 5. This is particularly advantageous for use of the lifting unit 12 in underground mines and passageways where minimal overhead clearance is available above the operating equipment.

Figure 7:
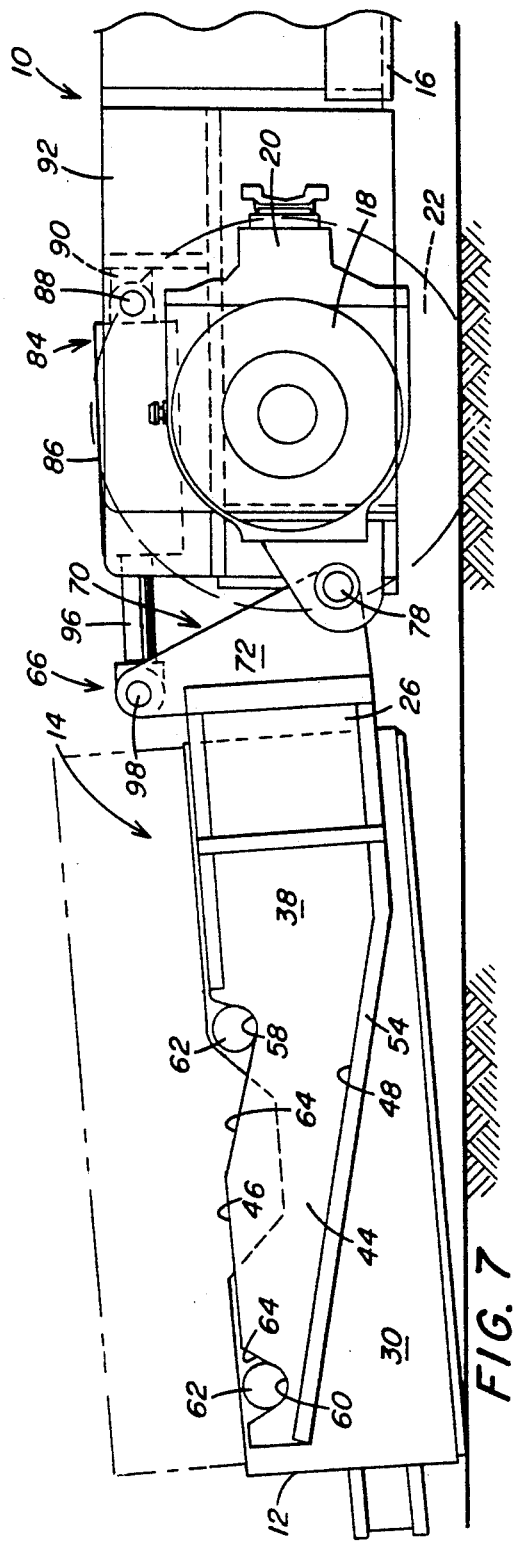
FIG. 7 is a view similar to FIG. 6, illustrating the initial engagement of the lift unit with the battery holder as the holder is raised from the ground.

To further illustrate the advantage of the present invention, a low profile mobile vehicle 10 is shown in FIGS. 6 and 7 where the frame 16 has a lower ground clearance than shown for the vehicle frame 16 in FIGS. 3-5. Further, to permit operation of the vehicle 10 in mine passageways having extremely low overhead clearance wheels 22 having a diameter less than the diameter of the wheels 22 shown in FIGS. 3 and 5 are installed on the vehicle 10.

In mines of extremely minimal overhead clearance there is little or no provision for pivotal movement of a lift unit above the vehicle frame for movement of the battery holder to an operating position. With the present invention the lift unit 14 engages the battery holder 12 in a secure manner for movement between the position of the battery holder 12 on the ground to an operating position where the holder 12 is substantially horizontal to the ground, as shown in FIG. 6. Due to the configuration of the lifting forks 38 and 40, as above discussed, combined with the features of the inclined or camming surfaces 64 on the plates 44, the battery holder 12 is firmly engaged and supported by the lift unit 14 as it is vertically raised and before it reaches a normal operating height, as shown in FIG. 6. For the battery holder 12 to be firmly supported by the lift unit 14 it is not necessary to pivot the lift unit 14 above the normal operating height of the battery, as shown in FIG. 6.

The lifting forks 38 and 40 of the lift unit 14 are positioned closely adjacent to the side walls 28 and 30 of the battery holder 12. No lateral movement of the lift unit 14 is required to raise the battery holder 12 from the ground. This is particularly desirable in underground passageways having minimal or no clearance adjacent to the side walls of the passageway. With the present invention the lifting forks 38 and 40 can be positioned closely adjacent to the side walls of a mine passageway while permitting a full range of movement for raising and lowering the battery holder 12. Because only vertical pivotal movement of the lift unit 14 is required, the lift unit 14 can be operated in any space where the mobile vehicle 10 is maneuvered.

Once the lift unit 14 with the battery holder 12 thereon is raised to the normal operating position, for example as shown in FIGS. 2, 5 and 6, the holder 12 can be locked in place on the lifting forks 38 and 40 by the provision of hold down pins 102 extending through a pair of plates 104 extending upwardly on each side of the recesses 58 and 60 outboard of the plates 44 which form the lifting forks 38 and 40. When the lugs 62 are firmly seated in the recesses 58 and 60, the pins 102 are advanced through aligned bores in the plates 104.

The pins 102 serve to resist upward movement of the lugs 62 out of the recesses 58 and 60 upon a force applied to dislodge the battery holder 12 from the lift unit 14. Furthermore, the provision of the inclined surfaces 64 precludes manhandling of the battery holder 12 to move it into its final secure position on the lifting forks 38 and 40. Once the lifting forks 38 and 40 engage the lugs 62, the battery holder 12 is advanced into a secure position on the lift unit 14. As the unit 14 is raised, the lugs 62 slide along the inclined surfaces 64 into the recesses 58 and 60. When the lugs 62 are firmly seated in the recesses 58 and 60, the hold down pins 102 are installed to further safeguard against displacement of the battery holder 12 from the lifting unit 14.

According to the provisions of the patent statutes, I have explained the principle, preferred construction, and mode of operation of my invention and have illustrated and described what I now consider to represent its best embodiment. However, it should be understood that within the scope of the appended claims, the invention may be practiced otherwise than as specifically illustrated and described.

I claim:

1. A mobile battery changer comprising,
   a mobile frame including means for propelling said frame on ground and having a front end portion and a rearward end portion,
   a battery lift unit,
   mounting means for pivotally connecting said battery lift unit to said frame rearward end portion,
   actuation means extending between said battery lift unit and said frame rearward end portion for pivoting said battery lift unit on said mobile frame between a first position for engaging a battery holder having peripheral surfaces and positioned on the ground and a second position for raising the battery holder to a preselected elevation above the ground,
   said battery lift unit having a pair of lifting arms extending in spaced parallel relation from said mobile frame rearward end portion to form an opening for receiving the battery holder;
   said lifting arms each including an upper surface positioned horizontally when said lift unit is in said second position and a recessed portion positioned below said upper surfaces for supporting the battery holder on said lift unit,
   guide means on said upper surface for receiving the weight of the battery holder to direct the battery holder to a stabilized position on said battery holder, and
   said guide means including an inclined load bearing surface extending from said lifting arm upper surface downwardly to said recessed portion to initially receive the battery holder upon upward movement of said battery lift unit and guide the battery holder upon upward pivotal movement of said battery lift unit downwardly to a position firmly engaged on said lift unit to support the battery holder as the battery holder is raised from said first position to said second position for transport of the battery holder.

2. A mobile battery changer as set forth in claim 1 which includes,
   a longitudinal axis extending on said mobile frame, and
   said pair of arms positioned in spaced parallel relation and extending from said mobile frame symmetrically about said longitudinal axis.

3. A mobile battery changer as set forth in claim 1 in which,
   said lifting arms each having an inboard surface extending closely adjacent to the periphery of the battery holder for receiving and supporting the weight of the battery holder for movement between said first and second positions.

4. A mobile battery changer as set forth in claim 3 in which,
said mobile frame has laterally spaced side walls, and
said lifting arms each having an outboard surface positioned in alignment with said frame lateral side walls such that said lifting arms do not extend laterally beyond said side walls.

5. A mobile battery changer as set forth in claim 1 in which,
said mounting means and said actuation means are positioned in overlying relation at said rearward end portion of said mobile frame, and
said lift unit includes a pair of lift brackets extending between said mounting means and said actuation means.

6. A mobile battery changer as set forth in claim 1 in which,
said actuation means is horizontally supported on said mobile frame and includes a piston cylinder assembly having a piston movable in a horizontal plane to generate pivotal movement of said lift unit about said mounting means.

7. A mobile battery changer as set forth in claim 1 in which,
said lift unit includes a support plate connected to and extending transversely on said frame rearward end portion,
said lifting arms connected to opposite end portions of said support plate, and
said lifting arms extending in parallel relation from said support plate to form said opening for receiving the battery holder.

8. A mobile battery changer as set forth in claim 7 in which,
said arms each include a lower surface with an angled portion for expanding the range of pivotal movement of said arms between a lowermost pivoted position on the ground and an upper pivoted position at a preselected elevation above the ground.

9. A mobile battery changer as set forth in claim 1 in which,
said guide means on said upper surface includes a camming surface for guiding the battery holder to a final position in said recessed portion.

10. A mobile battery changer as set forth in claim 1 in which,
said mobile frame has a preselected height, and
said battery lift unit being pivotally connected to said mobile frame for movement between a lowermost position adjacent to the ground to pick-up the battery holder and an uppermost position within said height of said mobile frame for transporting the battery holder.

11. A battery lift unit comprising,
a frame movable relative to ground and including an elongated support plate having opposite end portions,
a pair of lift arms connected to said plate opposite end portions and extending forwardly in spaced parallel relation therefrom to form an opening for receiving a battery holder,
a pair of brackets connected in spaced parallel relation to said support plate and extending therefrom in a direction oppositely of said lift arms,
means positioned on said pair of brackets for receiving a pivot pin to support said frame for pivotal movement about the pin,
actuating means connected to said pair of brackets for actuating pivotal movement of said frame about said pivot pin to lift said pair of lift arms relative to the ground,
said pair of lift arms each having an upper surface with a camming portion extending downwardly from said upper surface for initially receiving the battery holder upon upward pivotal movement of said frame and guiding the battery holder downwardly on said camming portion to a position securely supported by said lift arms, and
said camming portion including an inclined surface for guiding the battery holder into a recess at an end of said inclined surface.

12. A battery lift unit as set forth in claim 11 in which,
said lift arms each include a lower surface extending upwardly at an angle from the ground to permit pivoting said lift arm to a lowermost position adjacent to the ground to pick-up the battery holder.

13. A battery lift unit as set forth in claim 11 in which,
said pair of lift arms extend forwardly in close adjacency to the periphery of the battery holder to laterally support the battery holder through a range of pivotal movement from adjacent to the ground to a horizontal position above the ground.

* * * * *